(12) United States Patent
Cahill

(10) Patent No.: US 9,376,093 B2
(45) Date of Patent: Jun. 28, 2016

(54) SYSTEM AND METHOD FOR INDEPENDENT BRAKING SYSTEM ENABLEMENT

(71) Applicant: GOODRICH CORPORATION, Charlotte, NC (US)

(72) Inventor: Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 188 days.

(21) Appl. No.: 14/074,445

(22) Filed: Nov. 7, 2013

(65) Prior Publication Data
US 2015/0127195 A1    May 7, 2015

(51) Int. Cl.
*B60T 7/04*   (2006.01)
*B60T 7/06*   (2006.01)
*B64C 25/42*  (2006.01)
*B60T 8/17*   (2006.01)
*B64C 25/44*  (2006.01)
*B64C 25/46*  (2006.01)

(52) U.S. Cl.
CPC . *B60T 7/06* (2013.01); *B60T 7/042* (2013.01); *B60T 8/1703* (2013.01); *B64C 25/42* (2013.01); *B64C 25/44* (2013.01); *B64C 25/46* (2013.01); *B60T 2220/04* (2013.01)

(58) Field of Classification Search
USPC .............................................................. 701/3
See application file for complete search history.

(56) References Cited

U.S. PATENT DOCUMENTS

2008/0142318 A1    6/2008   Griffith et al.

FOREIGN PATENT DOCUMENTS

EP           1690787           8/2006

OTHER PUBLICATIONS

Extended European Search Report dated Mar. 20, 2015 in European Application No. 14191463.0.

*Primary Examiner* — Shelley Chen
(74) *Attorney, Agent, or Firm* — Snell & Wilmer L.L.P.

(57) ABSTRACT

Described herein is a system and method to enable braking system operation independent of conventional aircraft signals, such as those tied to the hibernation commands. Stated another way, the present disclosure relates to the enablement of a braking system in response to an initiation signal. In this way, the crew has the ability to force the braking system out of a hibernation mode into an "emergency type" braking mode if desired. The concepts described herein may be applicable to an electric braking system and to a hydraulic braking system.

15 Claims, 5 Drawing Sheets

SYSTEM AND METHOD FOR INDEPENDENT BRAKING SYSTEM ENABLEMENT

FIELD OF INVENTION

The present disclosure relates to braking the wheels of aircraft landing gear and more specifically initiation of braking systems.

BACKGROUND

Vehicle wheels, such as aircraft landing gear, are typically equipped with brakes in order to slow and/or stop the vehicle. For example, aircraft brakes are used to stop an aircraft after landing or during a rejected take-off braking stop. Aircraft braking systems may be electric or hydraulic braking systems.

SUMMARY

Described herein is a system and method to enable braking system operation independent of conventional aircraft signals, such as those tied to hibernation commands. Stated another way, the present disclosure relates to the enablement of a braking system in response to an initiation signal. In particular, an aircraft braking system may include a brake pedal and a switch configured to enable power delivery to a sensor coupled to the brake pedal. The sensor assembly may be configured to measure brake pedal movement and duration of movement above a predetermined threshold of time. In response to measuring the brake pedal moving a predetermined distance for a predetermined duration a braking system may be enabled.

A hydraulic aircraft braking initialization system may include a brake pedal of an aircraft and a sensor coupled to the brake pedal. The sensor may be configured to measure the movement of the brake pedal and duration of the movement above a predetermined threshold of time. In response to measuring the brake pedal moving a predetermined distance for a predetermined duration, a braking system may be toggled from disabled mode to an enabled mode.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Certain signals in aircraft systems are of critical importance to daily aircraft operation as compared to other systems and signals. It may be desirable that these signals have an unencumbered path to execution if needed. Stated another way, being able to effectuate these systems may potentially eliminate a catastrophic event from occurring.

Figure 1A:
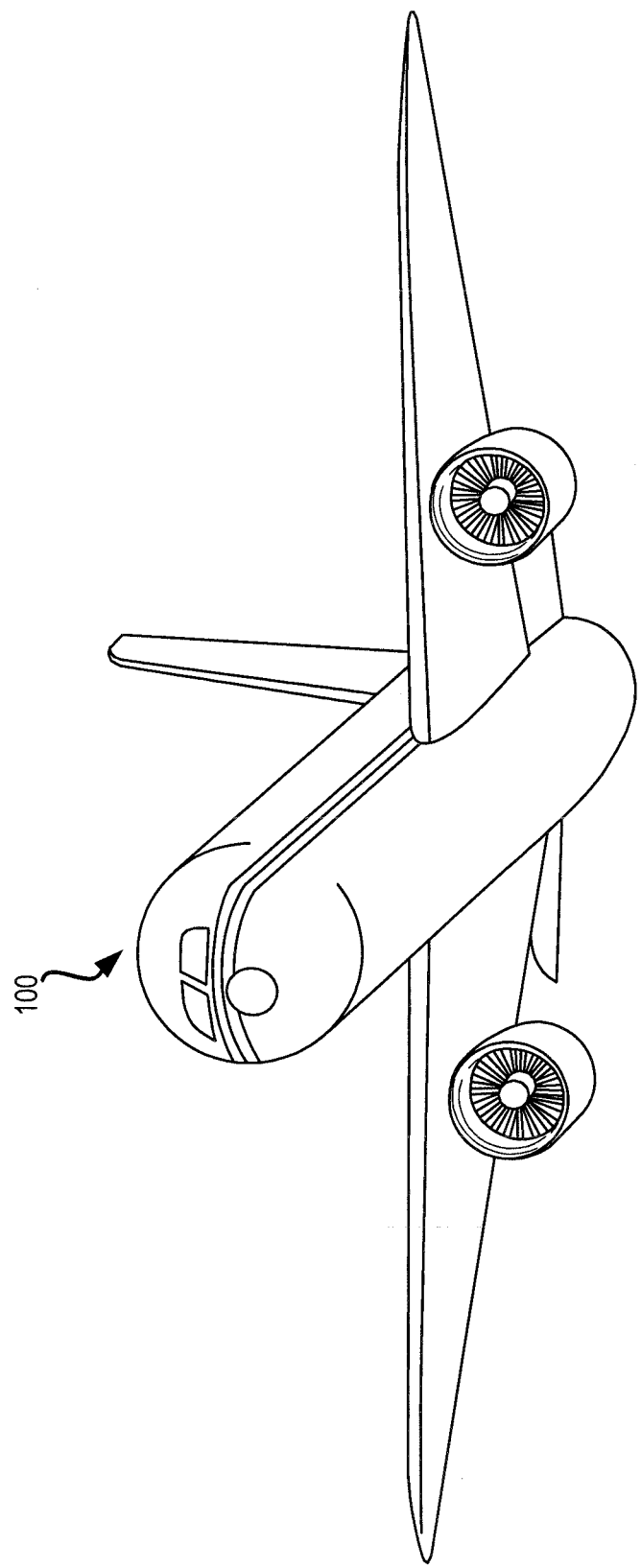
FIG. 1A illustrates, in accordance with various embodiments, a front view of an aircraft having a braking system.

With reference to FIG. 1A, many aircraft, for example, aircraft 100, comprise hydraulic and/or electric braking systems that hibernate (i.e., go into a power down and/or standby state during flight) (see FIG. 1A). This means that the braking system is unavailable to the crew while the plane is in flight. Conventionally, the braking system enables in response to the landing gear being in the down position and disable in response to the landing gear being in the stowed position. Described herein is a system and method to enable braking system operation independent of conventional aircraft signals, such as those tied to the hibernation commands. Stated another way, the present disclosure relates to the enablement of a braking system in response to an initiation signal which is detached from and/or independent from hibernation system commands. Stated another way commands outside of the braking system. In this way, the pilot and/or crew has the ability to force the braking system out of a hibernation mode into an "emergency type" braking mode if desired. The concepts described herein may be applicable to an electric braking system and/or to a hydraulic braking system.

Figure 1B:
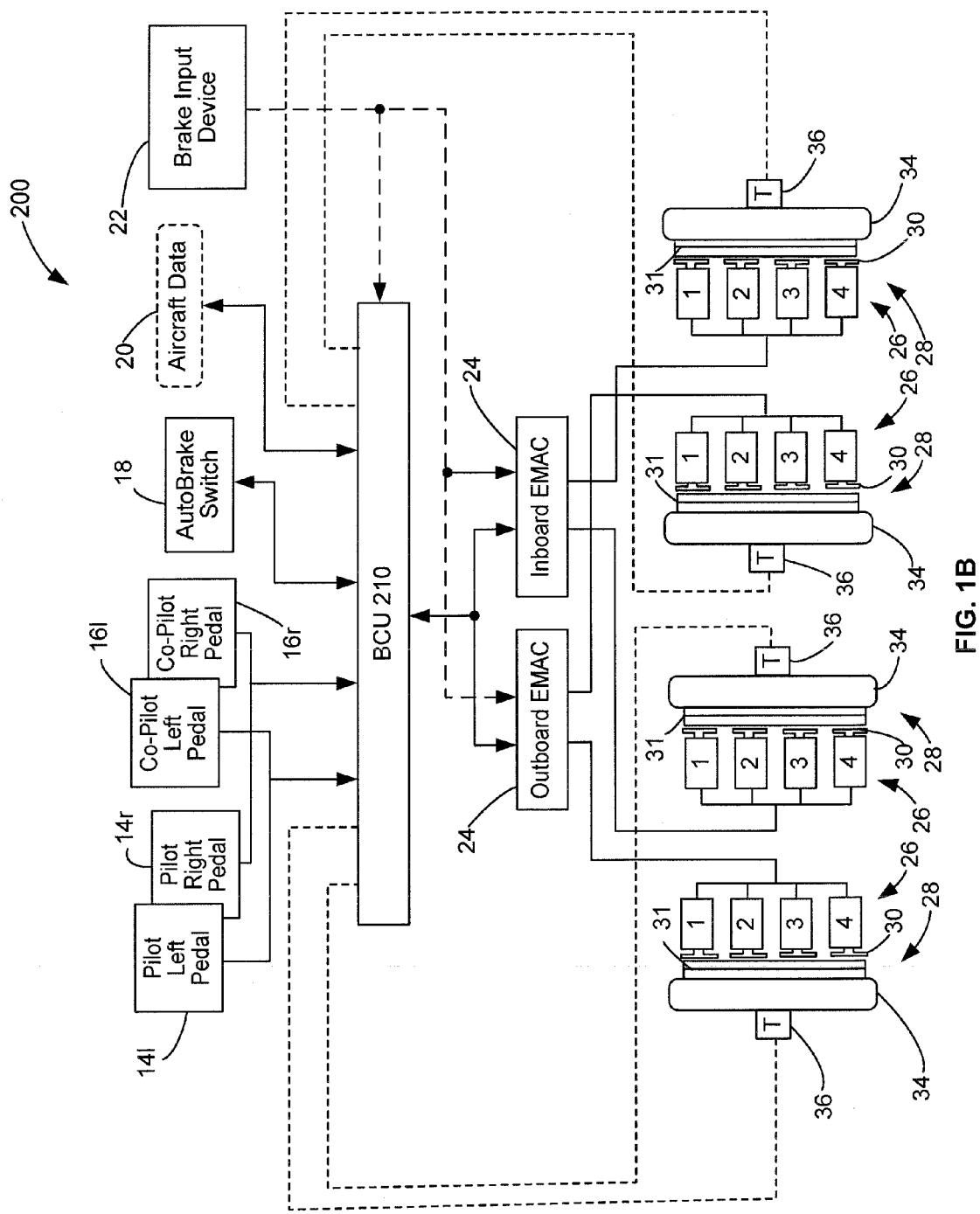
FIG. 1B illustrates, in accordance with various embodiments, a braking system.
Figure 2:
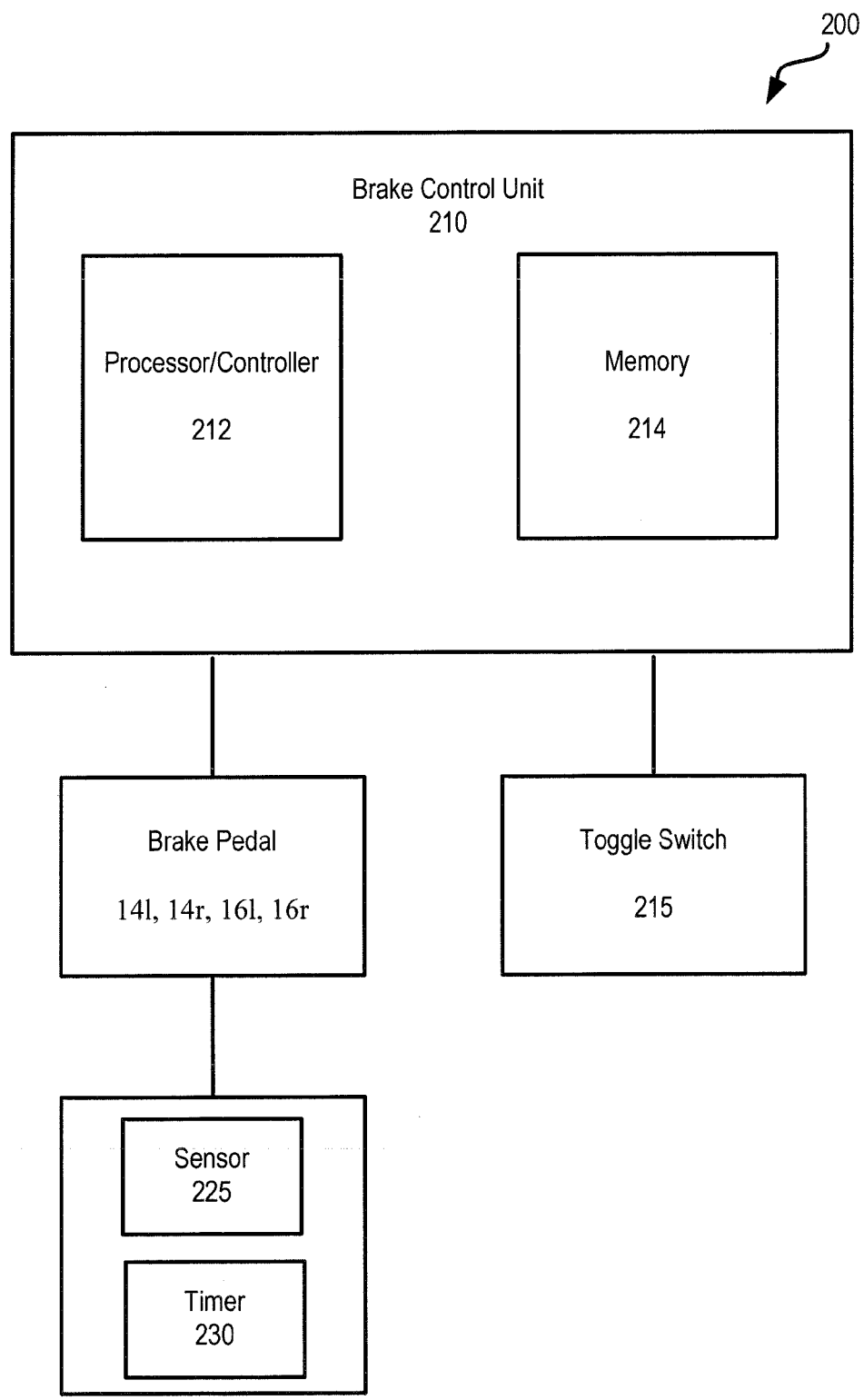
FIG. 2 illustrates, in accordance with various embodiments, a portion of a braking system.

With brief reference to FIGS. 1A and 1B, braking systems on aircraft 100 may comprise a brake control unit (BCU) 210. Referring initially to FIG. 2, there is shown an exemplary electrical brake system 200 having architecture as disclosed herein. The exemplary electrical brake system 200 includes a brake system control unit (BCU) 210 configured to carryout braking operations of the aircraft 100. The BCU 210 is configured to receive various operator inputs, such as left and right pilot brake pedal signals from left and right pilot brake pedals 14*l* and 14*r*, and left and right co-pilot brake pedal signals from left and right co-pilot brake pedals 16*l* and 16*r*. The brake pedal signals can be generated, for example, via LVDTs (linear variable differential transformers—not shown) operatively coupled to the respective pedals. As the pedals are depressed, each LVDT generates a voltage signal corresponding to the degree of pedal deflection, and this voltage signal can be provided to the BCU 210. As will be appreciated, other known methods for generating the brake pedal signals may also be employed, including encoders, potentiometers, or the like.

The BCU 210 may also receive other operator inputs, such as data from an autobrake switch 18 for configuring autobrake logic. The autobrake switch 18 may include several settings, such as an enable/disable input, an auto braking level input (e.g., low, medium, high) and a rejected take off (RTO) input (e.g., for enabling or disabling RTO functionality). The BCU 210 may also receive other aircraft 100 data 20, such as discrete data (e.g., sensor data such as weight-on-wheels, landing gear up/down, etc.), analog data (e.g., force data, temperature data, etc.), serial data, etc.

The BCU 210 is communicatively coupled to one or more electro-mechanical actuator controllers (EMACs) 24, wherein the BCU 210 provides a brake force signal to the respective EMACs 24 during normal braking operations. Preferably, the coupling is via a serial communication link, although data also can be exchanged via discrete and/or analog connections. The BCU 210 is configured to derive the brake force signal based on brake data generated by the pedals 14*l*, 14*r*, 16*l*, 16*r*, and/or autobrake and antiskid control.

A brake input device 22, preferably a combination parking brake/emergency brake device (e.g., a handle, lever, pedal, or the like), provides a brake command signal to each EMAC 24. The brake command signal can be generated using known techniques, such as an LVDT as described above with respect to the brake pedals 14*l*, 14*r*, 16*l*, 16*r*, or via an encoder or potentiometer configured to provide data corresponding deflection or rotation of the brake input device 22. As will be appreciated, other known methods of generating the brake command signal may also be employed. Preferably, the brake input device includes a mode selector to indicate when normal or parking/emergency braking is desired. For example, the brake input device 22 may include contacts that are open when the brake input device is in a first position (e.g., rotated to the left or pushed inward) and closed when the brake input device is in a second position (e.g., rotated to the right or pulled outward). Alternatively, the brake mode selector may be separate from the brake input device 22. The brake input device 22 can also provide separate braking signals for respective left and right side brakes.

The EMACs 24 are electrically coupled to one or more actuators 26 of a brake assembly 28, wherein each brake assembly 28 includes the one or more actuators 26, corresponding rams 30 operatively coupled to each actuator 26, and a brake-disk stack 31 having a plurality of rotors coupled for rotation with a wheel 34 and stators rotationally fixed with respect to the wheel 34. Each actuator 26 and ram 30 are configured for forceful engagement with the brake-disk stack 31 so as to provide a brake force to a corresponding wheel 34. Wheel speed sensors 36 provide wheel speed data to the BCU 210 for implementing anti-skid and autobrake functions.

In accordance with various embodiments and with reference to FIG. 2, the brake control unit 210 may receive an input brake command indicative of a desired amount of braking. For example, in various aircraft embodiments, brake pedals 14*l*, 14*r*, 16*l*, 16*r*, within the cockpit of the aircraft may be depressed to indicate a desired amount of braking. In response to the input brake command, the BCU 210 derives an output command signal in the form of a brake control signal or multiple brake control signals. Collectively, the brake control signals are intended to effectuate the desired amount of braking in relation to the input brake command.

With continued reference to FIG. 2, brake control unit 210 may comprise a computing device (e.g., processor 212) and an associated memory 214. Memory 214 may comprise an article of manufacture including a tangible, non-transitory computer-readable storage medium having instructions stored thereon that, in response to execution by a computing device (e.g., processor 212), cause the computing device to perform various methods.

As noted above, brake pedals 14*l*, 14*r*, 16*l*, 16*r* may be coupled to the BCU 210. A manual toggle switch 215 (described in greater detail below) may be electrically coupled to BCU 210.

It may be desired to circumvent the conventional programming of the braking system which may step through the lowering of the landing gear and then power up the braking system etc. and enable the braking system independently. The enablement of a portion of the braking system 200 may be in response to one or more signals being delivered to BCU 210. For instance, and with renewed reference to FIG. 2, a toggle switch 215 electrically coupled to BCU 210 may bring the brake pedals 14*l*, 14*r*, 16*l*, 16*r* out of a powered down state to a standby mode. In this way, the brake pedals 14*l*, 14*r*, 16*l*, 16*r* are capable of and configured to receive/sense input without inadvertent deployment of the braking system. Stated another way, in response to being in standby mode, braking system 200 may not perform braking functionality (i.e., command and/or effect the exertion of a braking force on one or more wheels) but may be configured to and/or be capable of sensing force applied to a brake pedal, such as through sensor 225. A brake pedal, such as a brake pedal in brake pedals 14*l*, 14*r*, 16*l*, 16*r*, may have a finite displacement path. For example, a brake pedal may exist at displacement 0 in response to the absence of external force. As an external force is applied to a brake pedal, the brake pedal may travel a distance until a maximum displacement is reached. A braking signal may comprise applying a force to brake pedals 14*l*, 14*r*, 16*l*, 16*r* to move brake pedals 220 to over a predetermined displacement threshold, such as greater than 50% of available path of travel for a predetermined length of time, as measured by timer 230. For instance, a user, such as a pilot, may press and hold one or more brake pedals 14*l*, 14*r*, 16*l*, 16*r* with enough force over a threshold for a predetermined length of time, such as a period of seconds (e.g. more than about 5 continuous seconds) to force braking system 200 out of standby mode and into a mode where braking is available. In a hydraulic braking system, (described in greater detail below), interlocks that may have been in place during powered down mode or standby mode are bypassed and hydraulic power/pressure is available to the braking system. In various embodiments, a braking system 200, such as an electrical braking system, (described in greater detail below) power to the electromechanical brake actuators (EBAs) and/or an electromechanical brake actuator assembly is achieved and the actuators may be capable of being driven. This bypassing may occur irrespective of and/or override other signals and programming of the aircraft. According to various embodiments, the signal to exit standby mode and enter operational mode need not be tied to force on a brake pedal 14*l*, 14*r*, 16*l*, 16*r* and may be a discrete second toggle switch or any other desired mechanism.

In response to the standby mode and/or the powered down mode being overcome, the braking system 200 may be configured to provide braking with respect to the aircraft wheels. For example, in various embodiments, an aircraft wheel and brakes comprise a non-rotatable wheel support, a wheel rotatably mounted to the wheel support, and a brake disk stack having alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head may house a plurality of EBAs that further comprise reciprocating rams that extend to compress the brake disk stack against the back plate. Torque is taken out by the stator disks through a static torque tube or the like. An aircraft brake system may include the brake disk stack, the brake head, and at least one EBA mounted to, for example, the brake head. The EBA may include a housing, a reciprocating ram and a motive device operatively connected to the reciprocating ram for selectively moving the reciprocating ram into and out of forceful engagement with the brake disk stack for applying and releasing braking force. The EBA is mounted to a surface of the brake head that is parallel to a friction surface of the brake disk stack.

Each wheel may be coupled to a brake disk stack. In this way, braking force may be applied to the brake disk stack using EBAs. Each wheel may be associated with a plurality of EBAs, such as four or six EBAs. It will be appreciated that various embodiments of braking system 200 may be extended to aircraft that include any number of wheels, any number of landing gear trucks, any number of axles per truck, and/or any number of EBAs.

Figure 3:
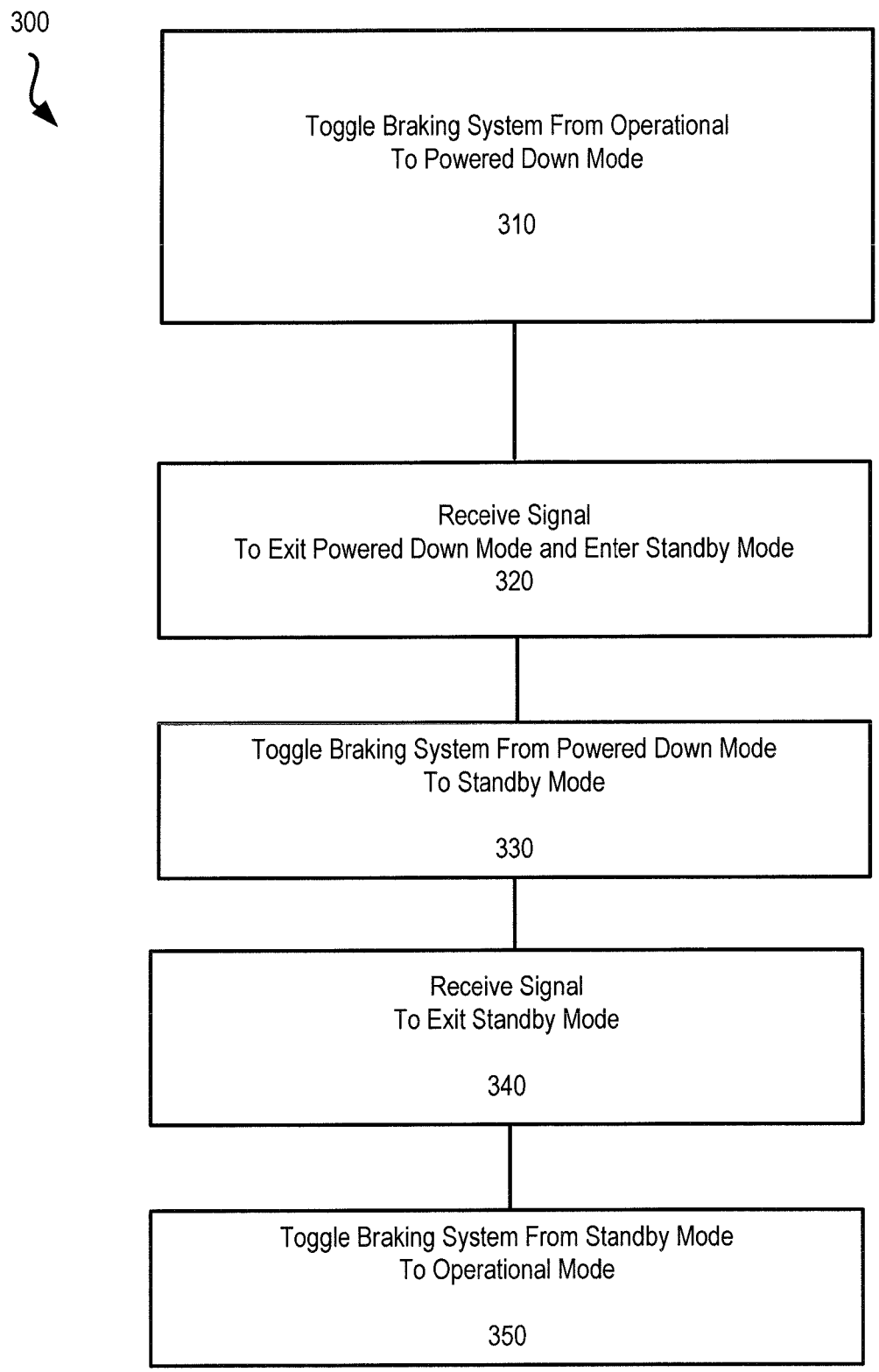
FIG. 3 illustrates, in accordance with various embodiments, a process for engaging an electric braking system.

In operation, and with reference to FIGS. 2 and 3, an electrical braking process 300 is disclosed. The electrical braking process 300 may be toggled from an operational mode to a powered down mode, such as in response to the aircraft entering flight (Step 310). A toggle switch 215, which may be a virtual toggle switch, such as one on a touch screen display or a mechanical toggle switch, such as lever, may send a signal to BCU 210 to exit powered down mode and enter standby mode (step 320). The electrical braking system 300 may transition/toggle from powered down mode to standby mode (step 330). In response to being in standby mode, power is delivered to the brake pedals 14*l*, 14*r*, 16*l*, 16*r* to receive signals. These signals may be associated with a brake pedal displacement measured by sensor 225 and timer 230. However, while in standby mode, force on the brake pedals does not result in action by the braking system actuators. In response to receiving a force on brake pedal 14*l*, 14*r*, 16*l*, 16*r* of a determined level and/or for a predetermined duration, standby mode may be exited and electrical braking system 300 may become available to exert braking force on the brake disk stack (Step 340). The predetermined duration may be any length of time, such as between 1 and 10 seconds and between 1 and 5 second, such as about 5 seconds. The predetermined force on the brake pedal may be any desired force and may be characterized as a path of travel of the brakes, such as between 25-100% of the total available path of travel, between 50 and 100% the total available path of travel, (e.g. 50%). For instance, 50% a path of travel may correspond to 50% of total potential force received by the brake pedals. Stated another way, electrical braking system 300 may transition/toggle from standby mode to operational mode (step 350). In this way, inadvertent braking availability and/or unintentional toggling from a powered down mode and/or standby mode directly to a "brake available" mode (operational) is reduced. Stated another way, electrical braking system 300 may be capable of and configured to initiate the delivery of power and commands to the EBAs. This capability may occur prior to deployment of the landing gear, after deployment of the landing gear, and/or at any suitable time. This capability overrides and/or bypasses other aircraft systems which would otherwise prevent electrical braking system 300 from being operational and/or entering an operational mode.

According to various embodiments, the toggle switch may toggle the electrical braking system 300 from powered down mode and/or standby mode directly to an available/operational mode. This may override and/or bypass other aircraft systems which would otherwise prevent electrical braking system 300 from being operational/available. Stated another way, enabling the electrical braking system 300 bypasses a second braking system enablement protocol.

In various embodiments, a hydraulic braking system is disclosed. For example, a hydraulic braking system may comprise a fluid power source, such as, for example, a hydraulic power source that serves as the main brake power supply within the hydraulic braking system. A main hydraulic line from the fluid power source may include a check valve and an accumulator. A hydraulic line may be input into a dual valve assembly included within the hydraulic braking system. The dual valve assembly includes a shutoff valve 40 through which the main hydraulic line supplies hydraulic fluid to the first and second wheel servo valves. Pressure supplied by the shutoff valve to the first and second wheel servo valves may be measured by a pressure sensor and provided to the BCU. Fluid from the first and second wheel servo valves is provided through first and second hydraulic lines, to a park valve which holds the applied braking force to the wheels during a parking brake operation. A return line may be provided from the first and second wheel servo valves back to the hydraulic power source. During normal operation, fluid pressure through the first and second hydraulic lines passes through the park valve and to corresponding actuators. Thus, provided the hydraulic braking system is functioning properly, the shutoff valve is open during braking and the BCU controls the amount of hydraulic pressure that is delivered to each wheel via the corresponding servo valve.

Figure 4:
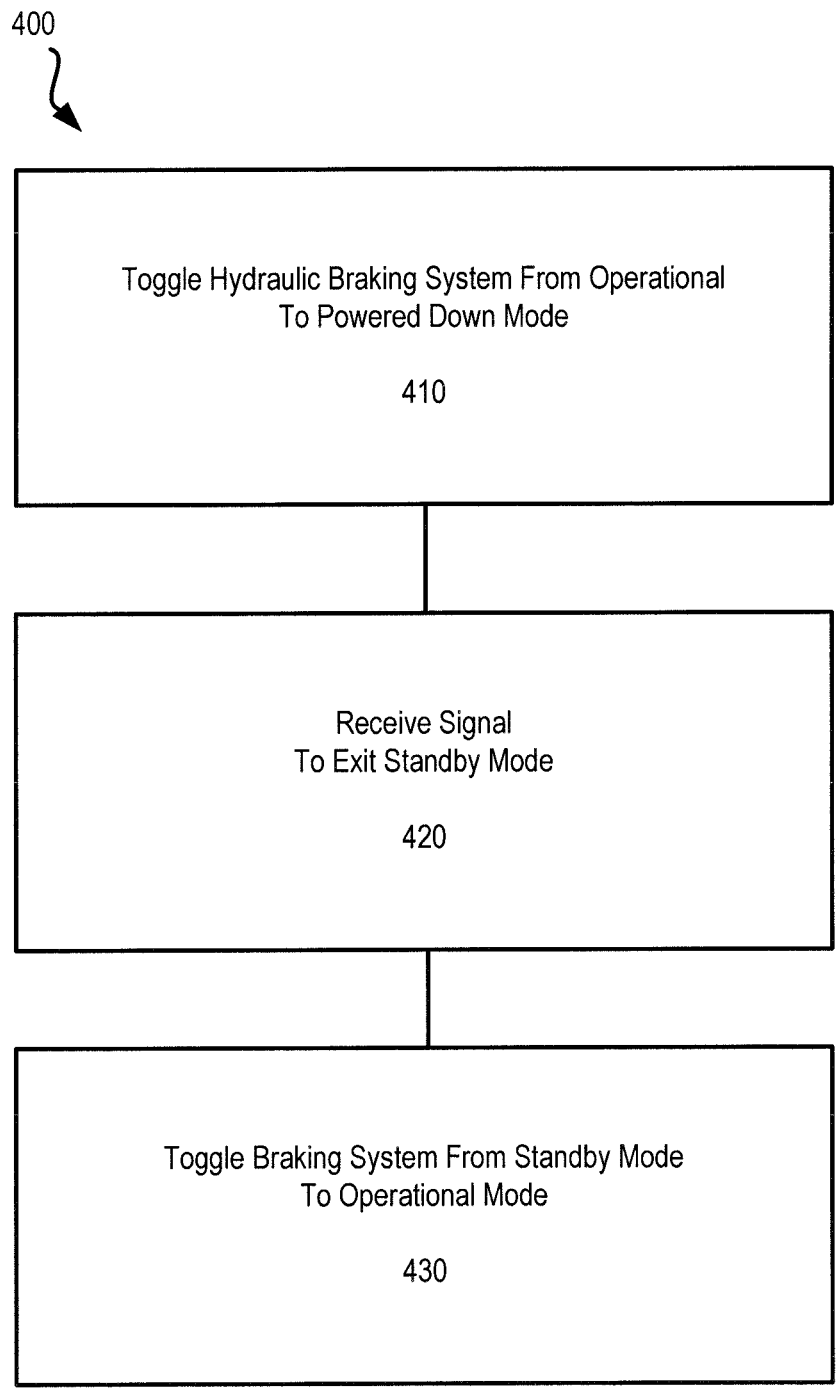
FIG. 4 illustrates, in accordance with various embodiments, a process for engaging a hydraulic braking system.

In operation and with reference to FIGS. 2 and 4 a hydraulic braking system 400 is disclosed. The hydraulic braking system 400 may be toggled from an operational mode to a powered down mode and/or a standby mode, such as in response to the aircraft taking off and entering flight (Step 410). In powered down mode and/or a standby mode, brake pressure is unavailable and/or is not increased in response to force on the brake pedal 14*l*, 14*r*, 16*l*, 16*r*. In response to both being in standby mode and/or powered down mode and receiving a force on brake pedal 14*l*, 14*r*, 16*l*, 16*r* of a determined level and/or for a predetermined duration, standby mode and/or powered down mode may be exited and operational mode may be entered so that hydraulic braking system 400 may be available (Steps 420, 430). Stated another way, hydraulic braking system 400 may be capable of hydraulic pressure through the braking system. This capability may occur prior to deployment of the landing gear, after deployment of the landing gear, and/or at any suitable time. This capability overrides and/or bypasses other aircraft systems which would otherwise prevent hydraulic braking system 400 from being operational. Indicators in the cockpit via a display and/or an alarm signal may designate at least one of that the hydraulic braking system 400 is in powered down mode, that hydraulic braking system 400 is in standby mode, and that hydraulic braking system 400 is enabled. According to various embodiments, the brake pedal 14*l*, 14*r*, 16*l*, 16*r* of a hydraulic system may be capable of sensing force while hydraulic braking system 400 is in a powered down mode.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft braking system comprising:
   a brake pedal; and
   a switch configured to enable power delivery to a sensor coupled to the brake pedal, wherein the sensor is configured to measure a brake pedal displacement and duration of the brake pedal displacement above a predetermined threshold of time, wherein in response to the sensor measuring the brake pedal displacement a predetermined distance for a predetermined duration, the aircraft braking system is enabled during flight, thereby forcing the aircraft braking system out of hibernation into an operational mode.

2. The system according to claim 1, wherein the aircraft braking system transitions from powered down mode to standby mode in response to toggling the switch.

3. The system according to claim 1, wherein the aircraft braking system transitions from standby mode to the operational mode in response to the sensor measuring the brake pedal displacement moving the predetermined distance for the predetermined duration.

4. The system according to claim 3, wherein in response to being in the standby mode, at least one of brake pressure is unavailable and an electromechanical brake actuator functionality is disabled.

5. The system according to claim 1, wherein the aircraft braking system is at least one of a hydraulic braking system and an electronic braking system.

6. The system according to claim 1, wherein in response to the aircraft braking system being enabled, at least one of brake pressure is available and an electromechanical brake actuator functionality is enabled.

7. The system according to claim 1, wherein the predetermined duration of time is about 5 seconds.

8. The system according to claim 1, wherein the predetermined distance is greater than about 50 percent of a total available brake pedal path of travel distance.

9. The system according to claim 1, wherein in response to the aircraft braking system being enabled, the aircraft braking system bypasses a second braking system enablement protocol.

10. The system according to claim 1, further comprising a brake control unit.

11. A hydraulic aircraft braking system comprising:
    a brake pedal; and
    a sensor coupled to the brake pedal, wherein the sensor is configured to measure a brake pedal displacement and duration of the brake pedal displacement above a predetermined threshold of time, wherein the hydraulic aircraft braking system is toggled from a disabled mode to an enabled mode in flight in response to the sensor measuring the brake pedal displacement moving the predetermined displacement for the predetermined duration, wherein in response to the hydraulic aircraft braking system toggling from the disabled mode to the enabled mode in flight, the hydraulic aircraft braking system is forced out of hibernation into an operational mode.

12. The system according to claim 11, wherein in response to the hydraulic aircraft braking system being in the enabled mode, brake pressure is available to deliver a clamping force on a wheel of the aircraft.

13. The system according to claim 11, wherein the predetermined duration of time is about 5 seconds.

14. The system according to claim 11, wherein the predetermined distance is greater than about 50 percent of a total available brake pedal path of travel distance.

15. The system according to claim 11, wherein in response to the hydraulic aircraft braking system toggling from the disabled mode to the enabled mode, the hydraulic aircraft braking system bypasses a second braking system enablement protocol.

* * * * *